March 3, 1959
K. ECKARDT ET AL
2,875,860
AUTOMATIC BRAKE SHOE RESETTING MECHANISM
FOR MOTOR VEHICLES AND TRAILERS
Filed April 27, 1956
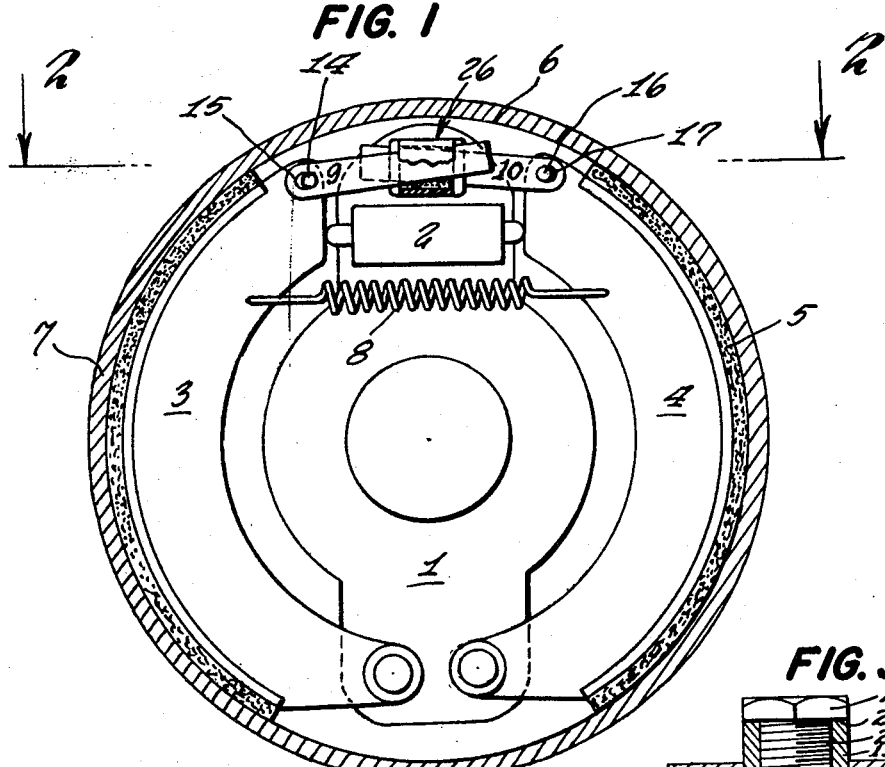
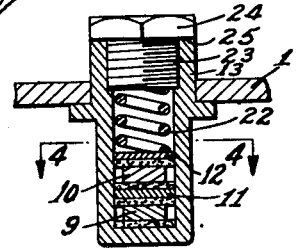
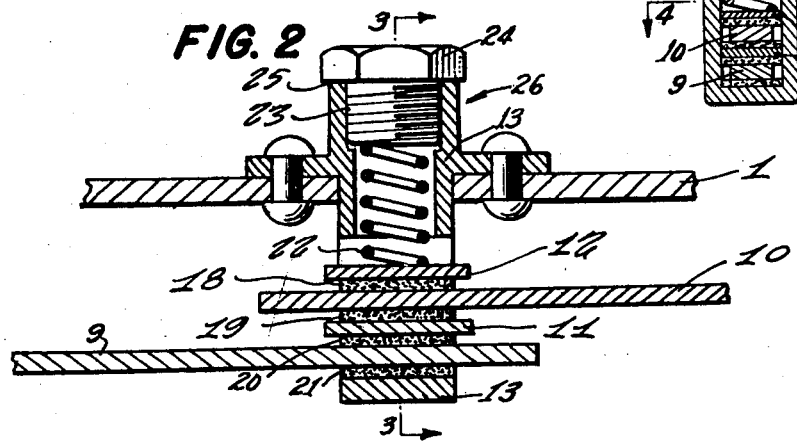
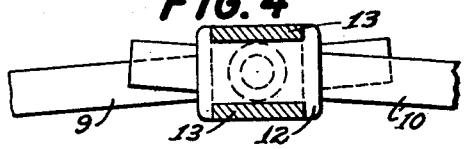
INVENTORS
KURT ECKARDT
& JOHANNES ECKARDT

United States Patent Office 2,875,860
Patented Mar. 3, 1959

2,875,860

AUTOMATIC BRAKE SHOE RESETTING MECHANISM FOR MOTOR VEHICLES AND TRAILERS

Kurt Eckardt and Johannes Eckardt, Leipzig, Germany

Application April 27, 1956, Serial No. 581,058

5 Claims. (Cl. 188—79.5)

This invention relates to automatic brake shoe resetting devices for automobiles, trucks and trailers and is directed particularly to such devices wherein movement of the brake shoes for applying and releasing the brakes is effected through play provided by movement of a rod or pin in an oversize opening, the position of the pin in the opening being controlled by a friction block in accordance with wear of the friction surfaces of the brake shoes and brake drum.

Such brake resetting devices heretofore devised had the disadvantage that they often reset the brakes by a greater amount than required by brake wear, whereupon the brakes would drag while driving. This undesired resetting of the brakes resulted because of various enlargement or expansion factors of the brake drum caused by heat, changes in the resiliency of the brake drum, and uneven or one-sided movement of the brake drum during operation of the brakes. Frictional heat during the braking action of course causes expansion of the brake drum. Moreover, the frictional surfaces of the brake drum are also sprung outwardly somewhat by the high outward pressure exerted by the brake shoes, amounting to several tons. The brake drum is thereupon shifted outwardly in the direction of operation of the self-strengthening primary brake shoe, or forward shoe, so that the primary brake shoe will be required to move farther than the secondary (rearward) brake shoe during braking action.

It is accordingly the principal object of our invention to provide an automatically resetting brake mechanism of the character described which is unaffected by the above-mentioned enlargements or changes in the brake drum, occurring while driving.

It is a more particular object of the invention to provide an automatic brake shoe resetting system of the character described, wherein the resetting mechanism is disposed close to the brake drum, so as to be heated by radiation therefrom during braking operation, whereby adjustment of the rod or pin in the oversize opening is so effected that the brake shoes can move freely against the brake drum for effective braking action even after the brake drum has been expanded by an emergency braking operation at maximum speed on such gripping road surfaces as concrete.

The opening in each resetting link member is dimensioned to control the play of the pertaining pin connected to its respective brake shoe, thereby at the same time controlling the movement of the brake shoes. The resetting link members of the pair of brake shoes are securely held between frictional surfaces of a friction block perpendicularly arranged with respect to the axis of the brake, and are drawn outwardly as necessitated by wear of the brake lining and brake drum friction surface. The strength of the pressure operating upon the friction surfaces of the friction block is determined by a tightly screwed spring and cap mechanism arranged parallel with the frictional surface of the brake drum so as to be easily accessible for disassembly or adjustment.

Differences between the amount of heat expansion by the brake shoes and the brake drum, which could otherwise adversely effect automatic brake resetting operation, are made ineffective by choice of a material for the resetting link members that will substantially compensate such differences.

Other objects, features and advantages of the invention will be apparent from the following description of a preferred embodiment of the invention presented by way of example in conjunction with the accompanying drawing, wherein:

Fig. 1 is a vertical outside view of a brake mechanism according to the invention, the brake drum being shown in cross-section, Fig. 2 is a horizontal cross-sectional view, taken along the line 2—2 of Fig. 1 in the direction of the arrows, and illustrating details of the friction block mechanism, Fig. 3 is a sectional view on line 3—3 of Fig. 2; and Fig. 4 is a top view and part-top view on line 4—4 of Fig. 3, with a top view of visible parts.

Referring now in detail to the drawings, the numerals 3 and 4 designate a pair of brake shoes having fixed thereto respective rods or pins 14 and 16 movable respectively in oversize openings 15 and 17 in one end each of a pair of resetting link members 9 and 10. The other ends of the link members 9 and 10 are held in place by friction within a friction block 26, as hereinbelow more fully described. The friction block 26 allows resetting of the link members 9 and 10, and thereby the brake shoes 3 and 4, in accordance with wear of the brake shoe and brake drum friction surfaces. According to the invention, the housing 13 of the friction block 26 is securely riveted to the stationary brake drum carriage member 1, as illustrated in Fig. 2. As illustrated in Fig. 1, the resetting link members 9 and 10 are located in close proximity to the friction surface 6 of the brake drum 7, so as to be readily influenced by radiated heat therefrom during operation of the brakes. The amount of play of the pins 14, 16, in their respective openings 15 and 17, is so dimensioned that the brake shoes 3 and 4 can move unhindered for effective braking, even when the brakes are applied for emergency stopping at high speed on a concrete or other hard gripping road surface.

During such a braking operation, outwardly-springing action and one-sided displacement of the brake drum will reach its greatest amount; however, the brake drum will only become moderately warm. High heating and consequent heat radiation of the brake drum will occur only during braking for a great distance while traveling downgrade. As a result, the brake shoes 3 and 4 and the resetting link members 9 and 10 will be subjected to heat expansion. Since, however, the brake shoes 3 and 4 will press with less force against the brake drum during downgrade application, as compared to an emergency brake operation, the brake drum will be correspondingly less outwardly sprung and displaced. For this reason, the above-mentioned play in the resetting link members 9 and 10 is not exhausted. Rather, during each downgrade application of the brakes, there remains an amount of reserve free movement of the brake shoes, which is sufficient to compensate for all differences due to heat expansion of the brake drum 7, the brake shoes 3 and 4, and the resetting link members 9 and 10.

The three above-mentioned conditions effecting enlargement of the brake drum 7 occur between ordinary short period emergency braking and braking for longer period during downgrade travel. Since the mechanism according to the invention does not effect undesired resetting of the brake mechanism during braking at each of these extremes of brake operating conditions, it will not effect undesired resetting under intermediate braking conditions. In other words, the brakes will be reset only in accordance with conditions necessitated by actual wear of the friction surfaces of brake drum 7 and the brake shoes 3 and 4.

As mentioned before, pin 14 connected to brake shoe 3 is accommodated with play in bore 15 of link 9. Since the precise required play between the pin 14 in the brake shoe 3 and the opening 15 in the resetting link member 9 can readily be controlled during manufacture, the movement of the brake shoe can be predetermined to within a tenth of a millimeter. To this end, in practice the cross-sectional size of the pin 14 is standardized and an assortment of resetting link members 9 with varying sizes of openings 15 are produced, in which the play of pin 14 is indicated to within a tenth of a millimeter. In the brake shoe carrier member 1, however, the play is indicated which is required for an enlargement of the brake drum 7 and unobstructed movement of shoes 3 and 4 occurring during an emergency breaking operation at high speed upon concrete. This play however, depends upon differing springing action and unilateral displacement of the brake drum according to the model of the vehicle, and is greater for the "primary" shoe (forward shoe) than for the "secondary" shoe (rearward shoe). It is therefore possible for the brake shoes 3 and 4 always to have the "correct" play when they are built with their "correct" resetting mechanisms.

According to the invention, the outer ends of the resetting link members 9 and 10 are secured between the friction surface elements 18, 19, 20 and 21 arranged perpendicularly with respect to the axis of the brake. These friction surface elements, as well as the interspacing plates 11 and 12, as shown in the cross sectional view of Fig. 3 and the top view of plate 12 in Fig. 4, are led from housing 13 against displacement parallel to the friction surfaces of the friction elements. However, they are displaceable vertically to the same friction surface. Because of their perpendicular disposition relative to the brake axis, the friction surface elements 18, 19, 20 and 21 are subjected only to pushing and pulling stresses of the resetting link members 9 and 10, and wear off equally their entire surface without any turning motion.

The strength with which the compression spring 22 acts upon the friction surface elements 18, 19, 20 and 21 of the friction block 26 is controlled by the tight setting of the screw cap 24 against the end 25 of the housing 13 by means of the screw threads 23. The friction surfaces of the friction block therefore always have the correct spring loading which is strong enough so that the resetting link members 9 and 10 are securely held without displacement, even when subjected to the full strength of the brake shoe return spring 8.

When disassembling the brake, screw cap 24, which is readily accessible from the open side of he brake drum 7, will first be unscrewed from part 25 of the housing 13 until the pressure of the spring 22 is fully relieved. Since there will then no longer be any pressure against friction faces 18, 19, 20, 21, the end surfaces of the resetting link members 9 and 10 will be forced inwardly by the brake shoe return spring 8. The brake shoes 3 and 4 will therefore be far withdrawn from the friction surface 6 of the brake drum 7. The brake shoes 3 and 4 can now be removed even when frozen or ground into the brake drum, which is possible in other automatic brake resetting mechanisms only with great difficulty.

If there are differences in heat expansion in the brake drum 7 and brake shoes 3 and 4 because of structural differences or differences in the materials used, the resetting link member 9 and 10 are made of a material having a greater or lesser co-efficient of expansion as required. According to the invention such differences can be balanced out to such an extent that they cannot effect resetting of the brake mechanism.

In the drawings, resetting link members 9 and 10 are shown fastened to the stationary brake carriage member 1 through the friction block 26. It will be evident, however, that the invention is applicable as well to brake systems having other forms of locking members, such as racks or clamp locks, irrespective of whether they operate with wedges, balls, clamping rollers of similar devices.

It is also to be noted that the drawings illustrate only one form of friction block by way of example. Though only one screw cap 23, 24 is shown, more such members could be used. Also, more than one spring 22 could be used for exerting pressure upon the friction surface element 18, 19, 20, and 21.

The screw 23 need not necessarily be accessible from the open side of the brake drum 7. It could also be so positioned as to be reached through an opening in the brake drum. Such an opening could be a round hole or a slit, which would be provided with a cover for closure when not being used.

It will furthermore be understood by those skilled in the art that the invention permits of various embodiments, modifications, and uses other than those specifically described without departing from the essential features of the invention as set forth in the claims annexed hereto.

What we claim is:

1. A self-operating brake resetting mechanism for vehicles comprising a brake drum having an annular friction surface, a stationary brake shoe carrier, a pair of brake shoes mounted in said brake drum for cooperative movement to effect braking, a locking mechanism connected with said brake shoe carrier, at least one pair of link members disposed between said locking mechanism and the movable ends of said pair of said brake shoes, said pair of said brake shoes and of said link members being disposed close to said annular brake drum friction surface and having substantially the same friction heat expansion as said annular brake drum friction surface during braking action, lost motion means for said link members, said lost motion means being sufficient to provide for maximum lost motion of each of said brake shoes respective to the maximum outwardly-springing action and one-sided displacement of said brake drum by an emergency braking operation at maximum speed on concrete.

2. The brake shoe resetting mechanism structure as defined in claim 1, wherein said maximum lost motion of the primary brake shoe is greater than that of the secondary brake shoe.

3. In an automatic brake shoe resetting mechanism for automotive vehicles and trailers, the combination comprising: a brake drum having a braking friction surface, a stationary brake shoe carrier mamber, a brake shoe member, having one end pivotally mounted on said brake shoe carrier member, and another end movable against said brake drum friction surface for applying and releasing the brake, a locking mechanism connected with said brake shoe carrier member, at least one link member disposed between said locking mechanism and said movable end of said brake shoe member, and including a plurality of friction surface members, a threaded member abutting against a stop, spring means, the tension of said spring means being controlled by said stop, lost motion means associated with said link member, said lost motion means being sufficient to allow effective braking and maximum lost motion of said brake shoe member respective to the maximum outwardly springing action and one-sided displacement of said brake drum by an emergency braking operation at the maximum speed on concrete.

4. In an automatic brake shoe resetting mechanism for automotive vehicles and trailers, the combination comprising: a brake drum having a braking friction surface, a stationary brake shoe carrier member, a brake shoe member, having one end pivotally mounted on said brake shoe carrier member, and another end movable against said brake drum friction surface for applying and releasing the brake, a locking mechanism connected with said brake shoe carrier member, at least one link member disposed between said locking mechanism and said movable end of said brake shoe member, and said locking mechanism including a plurality of friction surface members, a threaded member abutting against a stop, spring means, the tension of said spring means being controlled by said stop, parallelly disposed with respect to said brake drum friction surface, whereby said member may be made readily accessible before the disassembly of said brake drum, lost motion means associated with said link member, said lost motion means being sufficient to allow effective braking and maximum lost motion of said brake shoe member respective to the maximum outwardly springing action and one-sided displacement of said brake drum by an emergency braking operation at the maximum speed on concrete.

5. In an automatic brake shoe resetting mechanism for automotive vehicles and trailers, the combination comprising: a brake drum having a braking friction surface, a stationary brake shoe carrier member, a brake shoe member, having one end pivotally mounted on said brake shoe carrier member, and another end movable against said brake drum friction surface for applying and releasing the brake, a locking mechanism connected with said brake shoe carrier member, at least one link member disposed between said locking mechanism and said movable end of said brake shoe member, the material of which said link member is made having a coefficient of heat expansion which will substantially counterbalance differences in heat expansion between said brake drum and said brake shoe member, whereby said differences in heat expansion will be ineffective to cause resetting of said link member, lost motion means associated with link member, said lost motion means being sufficient to allow effective braking and maximum lost motion of said brake shoe member respective to the maximum outwardly springing action and one-sided displacement of said brake drum by an emergency braking operation at the maximum speed on concrete.

References Cited in the file of this patent

UNITED STATES PATENTS

| | | |
|---|---|---|
| 2,019,101 | Smith | Oct. 29, 1935 |
| 2,207,261 | Lane | July 9, 1940 |
| 2,241,479 | Rush | May 13, 1941 |
| 2,287,238 | Goepfrich | June 23, 1942 |

FOREIGN PATENTS

| | | |
|---|---|---|
| 369,177 | Great Britain | Mar. 17, 1932 |